US011085298B1

(12) United States Patent
Thompson

(10) Patent No.: US 11,085,298 B1
(45) Date of Patent: Aug. 10, 2021

(54) ROTARY INTERNAL COMBUSTION ENGINE

(71) Applicant: Marlin Harold Thompson, Boones Mill, VA (US)

(72) Inventor: Marlin Harold Thompson, Boones Mill, VA (US)

( * ) Notice: Subject to any disclaimer, the term of this patent is extended or adjusted under 35 U.S.C. 154(b) by 0 days.

(21) Appl. No.: 17/111,143

(22) Filed: Dec. 3, 2020

(51) Int. Cl.
| | |
|---|---|
| *F03C 2/00* | (2006.01) |
| *F03C 4/00* | (2006.01) |
| *F04C 18/00* | (2006.01) |
| *F04C 2/00* | (2006.01) |
| *F01C 1/22* | (2006.01) |
| *F01C 19/04* | (2006.01) |
| *F01C 19/10* | (2006.01) |
| *F02B 33/38* | (2006.01) |
| *F01C 1/12* | (2006.01) |
| *F02B 53/00* | (2006.01) |
| *F01C 19/02* | (2006.01) |
| *F04C 18/12* | (2006.01) |
| *F01C 11/00* | (2006.01) |

(52) U.S. Cl.
CPC ............... *F01C 1/22* (2013.01); *F01C 1/126* (2013.01); *F01C 11/00* (2013.01); *F01C 19/025* (2013.01); *F01C 19/04* (2013.01); *F01C 19/10* (2013.01); *F02B 33/38* (2013.01); *F02B 53/00* (2013.01); *F04C 18/126* (2013.01); *F04C 2240/60* (2013.01)

(58) Field of Classification Search
CPC .. F01C 1/22; F01C 1/126; F01C 11/00; F01C 19/00; F01C 19/025; F01C 19/04; F01C 19/10; F04C 18/126; F04C 2240/60; F02B 33/38; F02B 53/00; F16J 15/16; F16J 15/54
See application file for complete search history.

(56) References Cited

U.S. PATENT DOCUMENTS

| | | | | |
|---|---|---|---|---|
| 2,678,532 | A * | 5/1954 | Miller | .................... F01K 21/047 60/775 |
| 2,956,735 | A * | 10/1960 | Breelle | .................... F04C 18/20 418/10 |
| 3,275,225 | A * | 9/1966 | Schultz | ................. F04C 18/126 418/206.5 |
| 3,558,246 | A * | 1/1971 | Phillip | .......................... 418/117 |
| 3,685,922 | A * | 8/1972 | Lamm | ..................... F01C 19/04 418/113 |

(Continued)

*Primary Examiner* — Theresa Trieu
(74) *Attorney, Agent, or Firm* — Muncy, Geissler, Olds & Lowe, P.C.

(57) ABSTRACT

An internal combustion engine includes one or more pairs of non-meshing, externally timed rotors disposed within a housing in an expander module and a compressor module. Each rotor includes a cylindrical, center main body including a first end, a second end opposite the first end, an elongate portion extending between the ends and a first peripheral surface portion and a second peripheral surface portion and a bore extending through a center of the main body from the first end to the to second end. The rotors each have a groove extending along outer peripheral edge portions of the rotor. A pair of tip seals is disposed in the grooves. A pair of apex seals is disposed on the first peripheral surface portion and the second peripheral surface portion and an axially floating end plate is disposed at an end of the housing.

20 Claims, 16 Drawing Sheets

(56) References Cited

U.S. PATENT DOCUMENTS

| | | | |
|---|---|---|---|
| 3,799,035 A | | 3/1974 | Lamm |
| 3,994,266 A | * | 11/1976 | Jones .................... F04C 15/007 |
| | | | 418/140 |
| 4,086,881 A | | 5/1978 | Rutten |
| 4,207,039 A | * | 6/1980 | Eiermann ............... F01C 19/04 |
| | | | 418/113 |
| 4,683,852 A | | 8/1987 | Kypreos-Pantazis |
| 4,764,098 A | * | 8/1988 | Iwase .................. F04C 2230/91 |
| | | | 418/178 |
| 4,971,002 A | * | 11/1990 | Le .......................... F02B 53/08 |
| | | | 123/238 |
| 5,032,068 A | * | 7/1991 | Kurherr ................ F04C 18/20 |
| | | | 418/10 |
| 5,305,721 A | * | 4/1994 | Burtis .................... F02B 53/00 |
| | | | 123/218 |
| 8,434,449 B2 | | 5/2013 | Schneeberger |
| 8,597,006 B2 | | 12/2013 | Gekht et al. |
| 8,784,086 B2 | * | 7/2014 | Smith .................... F04C 2/126 |
| | | | 418/206.1 |
| 8,936,004 B1 | | 1/2015 | Buchanan |
| 9,017,052 B1 | * | 4/2015 | Soderstrom ............ F04C 2/123 |
| | | | 418/206.5 |
| 9,382,851 B2 | | 7/2016 | Shkolnik et al. |
| 2006/0196464 A1 | * | 9/2006 | Conners ................. F02B 53/00 |
| | | | 123/213 |
| 2007/0125320 A1 | | 6/2007 | Smith et al. |

\* cited by examiner

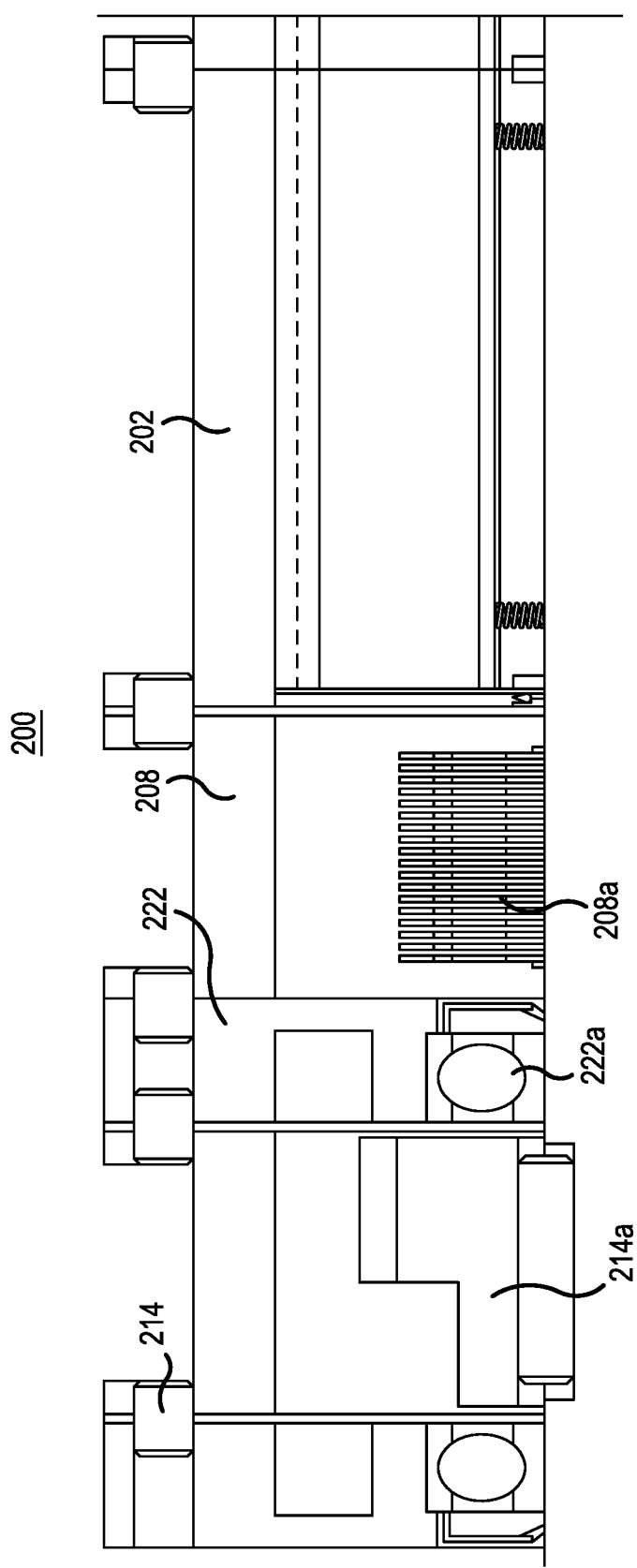

ROTARY INTERNAL COMBUSTION ENGINE

BACKGROUND OF THE INVENTION

Field of the Invention

The present invention generally relates to internal combustion engines and, more particularly, to a positive displacement rotary piston internal combustion engine.

Description of the Related Art

Since 1795, engineers and inventors have attempted to design a viable rotary steam engine. None of the conventional attempts have worked. Recent attempts at providing a rotary steam engine include the following engines: Cyclone, MYT, RadMax, Iris, Quasiturbine, Rotoblock, StarRotor, Doyle, Scuderi, Liquid Piston, Hartfield, Kugelmotor, Fibonacci, Vengeance, GoTek, Szorenyi, Rotary Vee, Russian (Swing Piston) YoMobile, Di Pietro, and Tata, etc.

Another attempt at the rotary steam engine is the Wankel engine. The Wankel engine uses an eccentric rotary design to convert pressure into rotating motion. The rotor in the Wankel engine, which creates turning motion, is similar in shape to a Reuleaux triangle, except that the sides of the rotor have less curvature. Wankel engines deliver three power pulses per revolution of the rotor using an Otto cycle. The output shaft of the engine, however, uses a toothed gear to provide one power pulse per revolution. In one revolution, the rotor experiences power pulses and exhausts gas simultaneously, while the four stages of the Otto cycle occur at separate times. The four-stage Otto cycle (i.e., intake, compression, ignition and exhaust) occurs during each revolution of the rotor at each of the faces of the triangular rotor moving inside an oval-like housing. An example of a Wankel-type engine is described in U.S. Pat. No. 5,305,721. The Wankel engines have a small amount of oil continuously introduced into the combustion chamber so they are not able to meet emissions standards. Also, the spring loaded tip sips in the Wankel engines constantly wear and, thus, have a short life.

Other conventional attempts at providing a rotary steam engine use a Brayton cycle. The "Brayton" cycle is a thermodynamic cycle that describes the workings of a constant-pressure heat engine. The original Brayton engines used a piston compressor and piston expander. Although the cycle is usually run as an open system, it is conventionally assumed for the purposes of thermodynamic analysis that the exhaust gases are reused in the intake, enabling analysis as a closed system. Traditional Brayton cycle engines are continuous flow engines using dynamic velocity instead of pressure so they must run at high speeds to develop power.

More recently, U.S. Pat. No. 8,784,086 disclosed a rotary piston engine with double rotary pistons having a variable inlet cut-off valve. The rotary valve has balanced dual inputs and outputs on opposite sides. This engine does not include seals. Thus, this engine suffers a same fate as most engines from the 1800's. Since it has a variable cut-off it can only be used as a steam engine.

SUMMARY OF THE INVENTION

In view of the foregoing and other exemplary problems, drawbacks, and disadvantages of the conventional methods and structures, an exemplary feature of the present invention is to provide an internal rotary combustion engine, which overcomes the drawbacks of conventional internal combustion engines. More specifically, the internal rotary combustion engine in accordance with certain exemplary embodiments is designed to provide 200 BHP at 3.000 RPM with 360 lb. ft. torque and a classic power-to-weight benchmark for engines of 1 BHP/Lb.

In a first, exemplary, non-limiting aspect of the present invention, a rotor includes a cylindrical, center main body including a first end, a second end opposite the first end, an elongate portion extending between the first end and the second end and having a first peripheral surface portion and a second peripheral surface portion and a bore extending through a center of the main body from the first end to the second end. The rotor further includes a pair of opposed, curved, outer peripheral edge portions, the pair of opposed, curved outer peripheral edge portions being alternatingly disposed between the first peripheral surface portion and the second peripheral surface portion, the pair of opposed, curved, outer peripheral edge portions forming an outer peripheral surface, each of the pair of opposed, curved, outer peripheral edge portions having a groove extending along the opposed, curved, outer peripheral edge portions; a pair of tip seals, each of the pair of tip seals being disposed in one of the grooves; and a pair of apex seals disposed on the first peripheral surface portion and the second peripheral surface portion.

In a second, exemplary, non-limiting aspect of the present invention, a rotor assembly includes a housing having a rotor chamber disposed therein and a pair of rotors disposed within the rotor chamber. Each rotor includes a cylindrical, center main body including a first end, a second end opposite the first end, an elongate portion extending between the first end and the second end and having a first peripheral surface portion and a second peripheral surface portion and a bore extending through a center of the main body from the first end to the second end. Each rotor further includes a pair of opposed, curved, outer peripheral edge portions, the pair of opposed, curved outer peripheral edge portions being alternatingly disposed between the first peripheral surface portion and the second peripheral surface portion, the pair of opposed, curved, outer peripheral edge portions forming an outer peripheral surface, each of the pair of opposed, curved, outer peripheral edge portions having a groove extending along the opposed, curved, outer peripheral edge portions; a pair of tip seals, each of the pair of tip seals being disposed in one of the grooves; and a pair of apex seals disposed on the first peripheral surface portion and the second peripheral surface portion.

In a third, exemplary, non-limiting aspect of the present invention, a rotary internal combustion engine includes an expander, a compressor and a rotary valve fluidly connecting the expander to the compressor. The expander includes a housing having a rotor chamber disposed therein and a pair of rotors disposed within the rotor chamber. Each rotor includes a cylindrical, center main body including a first end, a second end opposite the first end, an elongate portion extending between the first end and the second end and having a first peripheral surface portion and a second peripheral surface portion and a bore extending through a center of the main body from the first end to the second end. Each rotor further includes a pair of opposed, curved, outer peripheral edge portions, the pair of opposed, curved outer peripheral edge portions being alternatingly disposed between the first peripheral surface portion and the second peripheral surface portion, the pair of opposed, curved, outer peripheral edge portions forming an outer peripheral surface, each of the pair of opposed, curved, outer peripheral edge portions having a groove extending along the opposed, curved, outer peripheral edge portions; a pair of tip seals, each of the pair of tip seals being disposed in one of the grooves; and a pair of apex seals disposed on the first peripheral surface portion and the second peripheral surface portion. The compressor includes a housing having a rotor chamber disposed therein and a pair of rotors disposed within the rotor chamber. Each rotor includes a cylindrical, center main body including a first end, a second end opposite the first end, an elongate portion extending between the first end and the second end and having a first peripheral surface portion and a second peripheral surface portion and a bore extending through a center of the main body from the first end to the second end. Each rotor further includes a pair of opposed, curved, outer peripheral edge portions, the pair of opposed, curved outer peripheral edge portions being alternatingly disposed between the first peripheral surface portion and the second peripheral surface portion, the pair of opposed, curved, outer peripheral edge portions forming an outer peripheral surface, each of the pair of opposed, curved, outer peripheral edge portions having a groove extending along the opposed, curved, outer peripheral edge portions; a pair of tip seals, each of the pair of tip seals being disposed in one of the grooves; and a pair of apex seals disposed on the first peripheral surface portion and the second peripheral surface portion.

In accordance with the above, exemplary aspects of the present invention, the rotary internal combustion engine of the present invention is able to provide an engine that is scalable, in seven frame sizes, from 1 HP to 1.000 HP at 3,000 RPM. All models are able to achieve the benchmark numbers of 1 HP/in$^3$. and 1 HP/lb. Because of negligible friction, the engines can reach a thermal efficiency of 50%. Low combustion temperatures of 500° F. and complete combustion minimize nitrous oxide, carbon monoxide, and other toxic exhaust emissions. Fuel injector on-time will be controlled by an automotive mass air flow sensor and a programmable microprocessor in series with an inductive proximity switch. The torque curve is more like a two stroke diesel than a four stroke gasoline internal combustion engine.

In accordance with certain exemplary aspects of the present invention, an interrupted positive displacement Brayton cycle is provided. All Brayton cycle engines are velocity, not pressure driven (gas turbines) and are high speed continuous flow. Placing a rotary valve between the compressor module and expander module, as in the present invention, permits high torque and horsepower at low engine speeds.

Moreover, in mass production, it is estimated engines in accordance with the present invention can be produced for about 25% the cost of a conventional reciprocating internal combustion engine. There are no close tolerances except the bearing bores, alignment dowel bores and locations, and housing bores and widths. All castings not exposed to high temperatures are aluminum. The bearings are inexpensive 200 Series automotive bearings, for example. On the expander module, interleafed brass paddles cooled by fans (e.g., 12 VDC Muffin fans) keep heat from migrating along the shafts to the bearings. Timing gears are off-the-shelf spur and the shafts are polished and ground 4140 cold-rolled carbon steel. Most parts are common to the compressor module and the expander module, and plating the parts of the compressor module and the expander module with electro-less nickel reduces cost and enhances corrosion prevention.

In accordance with another exemplary aspect of the present invention, the pistons/rotors have custom seals for the major diameter, minor diameter and ends. An important feature is that the floating end plate makes light contact with the piston/rotor. That is, the clearances around the floating end plate determine the biasing pressures across the plate. Accordingly, the differential pressure would be approximately 1-2 PSIG (pounds per square in gauge), which means the floating end plate will be in contact with the piston without friction or wear. This seal arrangement makes the engine immune to temperature, providing a seal from −30° F. to 600° F. without combustion gas blow-by. The allowable high temperature does not require an external radiator. Biasing pressures and centrifugal force maintain minimal contact without friction and wear. The seal arrangement also eliminates the need for lubrication in the piston cylinder or compressor.

The pistons/rotors, shafts, and gears all run on true centers, eliminating the need for counterweights or other balancing measures. It permits speeds to 12,000 RPM without vibration. There is no critical speed where there is a resonance frequency. The pistons also act as flywheels, smoothing out combustion pulses and providing useful inertia.

Furthermore, with the configuration of the present invention, piston and machine timing is not critical. That is, the inverted pistons/rotors do not have any rotating adjacent surfaces so the piston/gear timing does not have to be precise. In the piston rotation, one quadrant is always active so there are no "dead spots" and the pistons do not have to be timed to the rotary valve. The only timing required for the engine is within the rotary valve itself, where the valve rotor is timed to the mounted inductive proximity switches that trigger the fuel injectors and spark plugs. A 12 VDC 0-3,000 RPM electric motor drives the valve rotor, but does not have to be timed. The electric motor also acts as a starter for the engine. The compressor module is belt driven from the expander module to produce 2 CFM/HP, but no timing is required. That is, the radial position of the pistons is no important because one piston quadrant will always be active.

It takes about 16 HP to drive a mid-sized car 60 MPH on a flat road with no wind. Most car engines have a thermal efficiency of 25%. 25% goes to friction, 25% goes into heat yin the radiator, 25% goes out the tailpipe, and 25% goes to the wheels. That means it takes 64 HP of energy from the fuel or 162,880 BTU's to get 16 HP or 40, 720 BTU's work. A gallon of gasoline has 114,000 BTU's so it takes 2.79 gallons to go 60 miles or 21.5 miles/gallon. Since the engine of the present invention has negligible friction, it will be advantages as compared to conventional engines.

Also, the hotter an engine can run, the more efficient it is. Conventional car engines are limited to 190° F. by the radiator thermostat. With the seal arrangement of the present invention, the expander module is immune to temperature, so it could run at 500° F., which will also provide an advantage over conventional engines.

Furthermore, Brake Mean Effective Pressure (BMEP) in a traditional internal combustion engine is the average pressure in the cylinder from top dead center (TDC) to bottom dead center (BDC) after ignition. In these traditional engines, this is a fixed number. Injector fuel flow into the engine of the present invention is governed by the mass air flow sensor. Since the expander module of the present acts as a positive displacement turbine, it will have a variable BMEP based on the torque load at the output shaft. If this pressure and tachometer data are fed into the programmable microprocessor as actual instantaneous HP demands and transmitted to the fuel injectors, this will provide a more accurate fuel flow requirement than using mass air flow and give higher efficiency. The conventional rotary engines are not able to provide such a variable BMEP.

Introducing a rotary valve between the compressor module and expander module creates an interrupted Brayton cycle and a new thermodynamic cycle. One concern with such an arrangement is that at high RPM the hot gases from combustion would back feed through the rotary valve. This, however, is not be a problem in the present invention. That is, in the present invention, the wave front propagation of gasoline when ignited is 4,000 In./Sec., so even at 12,000 RPM the pressure pulse will go to zero long before the next one arrives.

As compared to conventional engines, the engine of the present invention exhibits higher efficiency, is lower in cost to manufacture, has lower maintenance, has no starter, requires no lubrication, and emits low pollutants with no catalytic converter. As compared to conventional electric vehicles the engine of the present invention exhibits higher efficiency, is lower in cost to manufacture, has inexpensive maintenance, and provides unlimited mileage without a 4 hour charge on extended trips. The most popular electric car has 7,012 "C" size batteries, weighs 1,000 lbs, and a replacement battery pack costs $7,000. The batteries can explode or catch on fire in case of an accident.

Finally, the engine of the present invention can be used in hybrid vehicles. That is, the engine of the present invention will make a good power assist and extended range package for electric vehicles running at a constant speed because of the engine is light weight, small in physical size, and emits low pollution, while still providing the other advantages over conventional internal combustion engines.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 3A is a cross-sectional side view of a portion of the expander module;

FIG. 3B illustrates a side view of a heat sink 208a;

DETAILED DESCRIPTION OF EXEMPLARY EMBODIMENTS OF THE INVENTION

Figure 1:
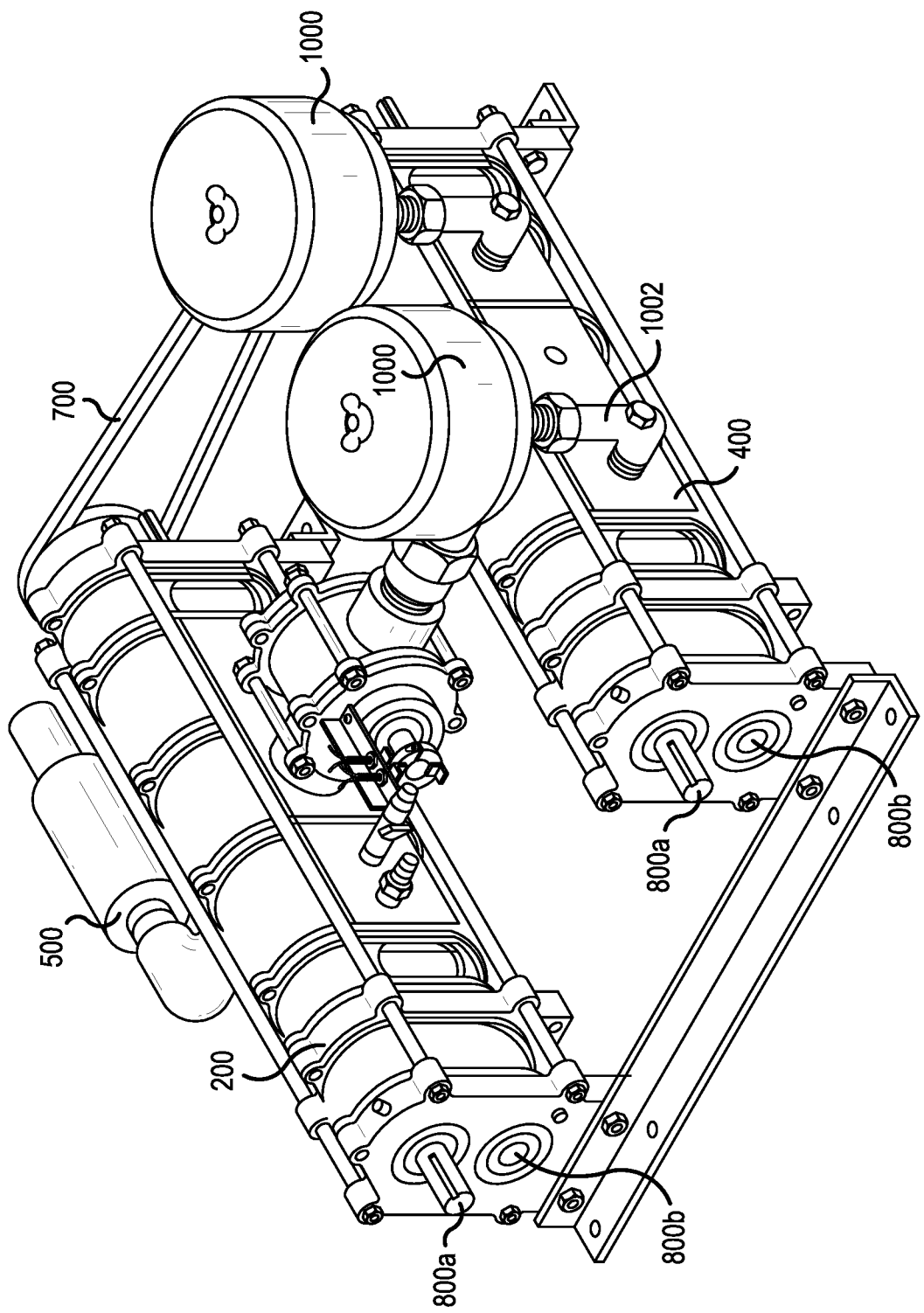
FIG. 1 illustrates a rotary piston internal combustion engine 100 in accordance with certain exemplary, non-limiting embodiments of the present invention.

Referring now to the drawings, and more particularly to FIGS. 1-14, there are shown exemplary embodiments of the rotary piston internal combustion engine according to the present invention.

FIG. 1 illustrates a rotary piston internal combustion engine 100 in accordance with certain exemplary, non-limiting embodiments of the present invention. As is illustrated in FIG. 1, the engine 100 includes at least an expander module 200, a rotary valve 300 and a compressor module 400. The engine also includes additional components including, but not limited to, a muffler 500, a pair of inlet filters 1000 and a belt drive (e.g., a "V" belt drive) 700.

Figure 2:
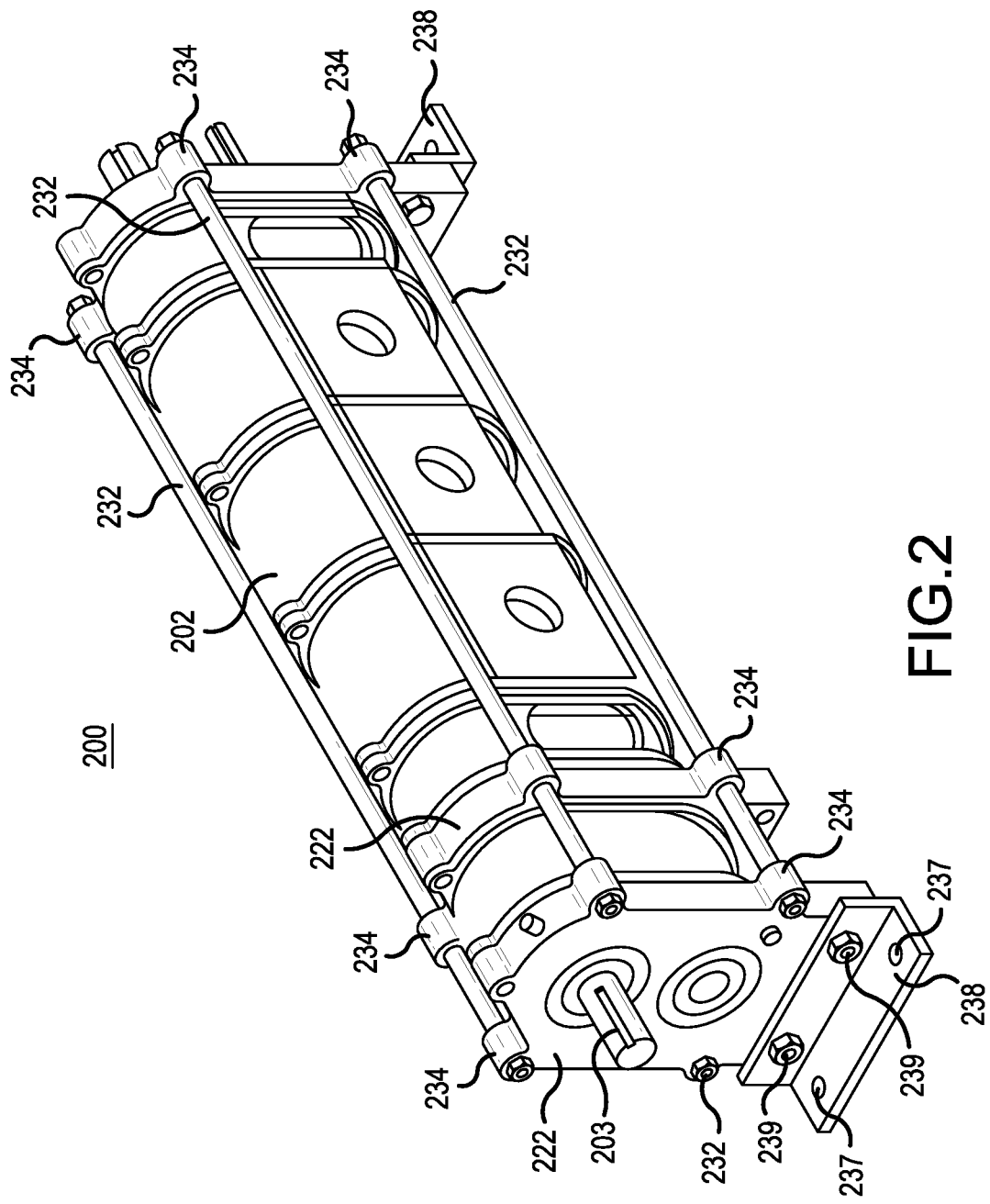
FIG. 2 illustrates a compressor module 400 (and similarly an expander module 200) in accordance with certain exemplary, non-limiting embodiments of the present invention.
Figure 3:
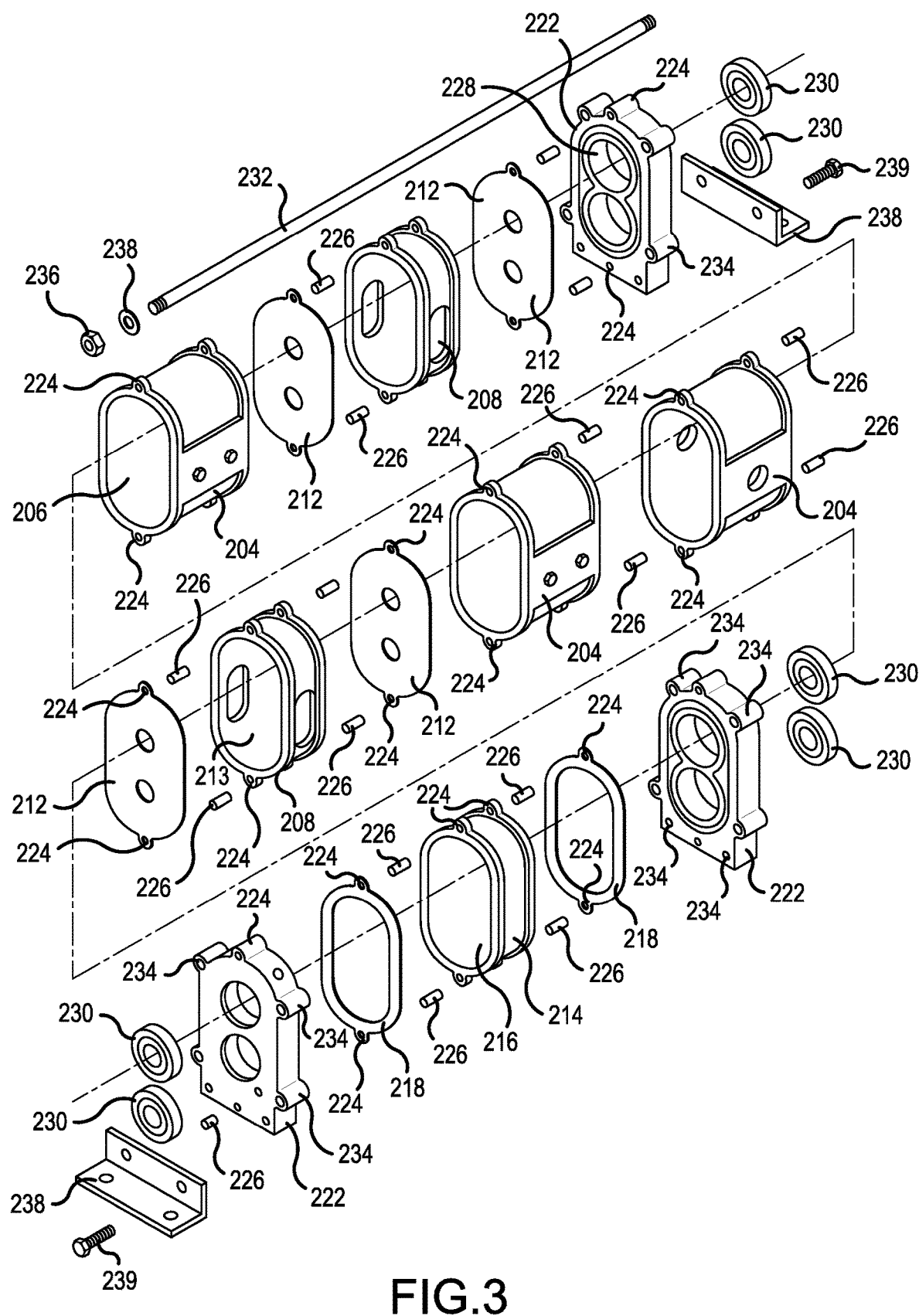
FIG. 3 illustrates an exploded view of the expander module 200 (and similarly a compressor module 400) illustrated in FIG. 2.

The expander module 200 and the compressor module 400 have a same basic structure as is illustrated in detail in FIGS. 2 and 3. FIG. 2 illustrates an assembled view of the expander module 200. The compressor module 400 has a same basic structure. The expander module 200 includes a support structure 202, a shaft assembly 203 extending through the support structure 202 and at least one rotor, including a pair of non-meshing externally timed rotary pistons, disposed within in the support structure 202.

In accordance with certain exemplary embodiments of the present invention, the expander module 200 (and the compressor module 400) includes three pairs of non-meshing externally timed rotary pistons in a common cylinder (e.g., within the support structure 202) with a total displacement of 195 Cu.

FIG. 3 illustrates an exploded view of the components of the support structure 202 for the expander module 200. As noted above, the support structure for the compressor module 400 has essentially a same structural design as the expander module 400 and a description thereof is not repeated.

Figure 3B:
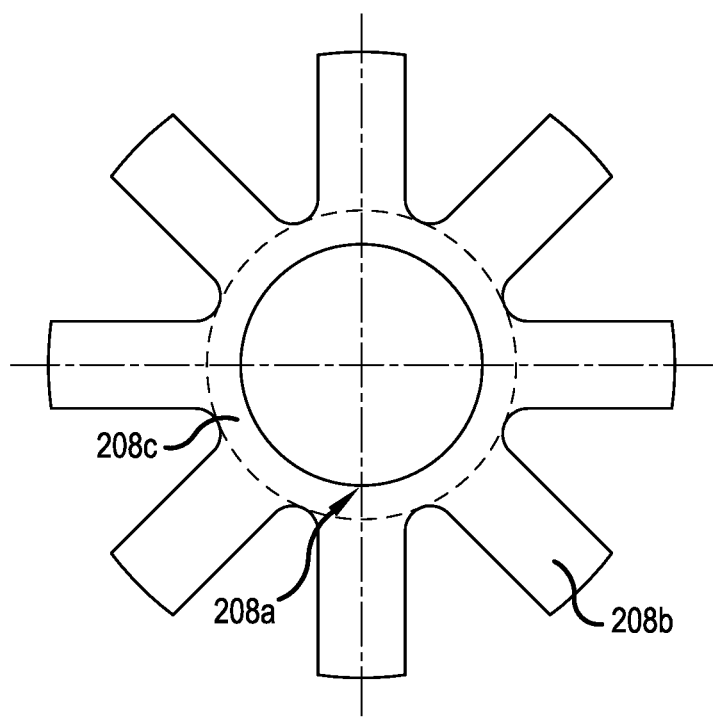

The support structure 202 includes one or more rotor housings 204. In the exemplary embodiment illustrated in FIG. 3, the support structure 202 includes three rotor housings 204. Each rotor housing 204 has a generally elliptical tube shaped body having an opening 206 extending through the rotor housing 204 and defining a cavity (or rotor chamber) therein. The cavity is configured to receive and contain a pair of non-meshing, externally timed pistons, which will be described in further detail below. One or more housing heat sinks 208 are disposed between the rotor housings 204. In the exemplary embodiment illustrated in FIG. 3, the support structure 202 includes two heat sink housings 208 disposed between the three rotor housings 204. FIG. 3A illustrates a cross-sectional view of a portion of the expander module 200. As is illustrated in FIG. 3A, the heat sink housing 208 is positioned between a bearing housing 222 and a piston housing 202. The heat sink housings 208 have an elliptical tube shaped body similar to that of the rotor housings and have an opening 210 extending through the heat sinks 208. A heat sink 208a is contained in each of the heat sink housing 208. FIG. 3B illustrates a side view of a heat sink 208a in accordance with an exemplary embodiment of the invention. As is illustrated in FIG. 3B, the heat sink 208a has a paddle wheel configuration including a plurality of paddles 208b and a washer 208c at a center of the wheel. The heat sinks 208a are configured to prevent heat from the expander module 200 from migrating along the shafts to overheat the bearings.

A side plate 212 is disposed on each end of the heat sinks 208 covering the opening 210. The fixed side plates 212 are configured as walls between adjacent housings.

The support structure 202 also includes a gear housing 214. The housing has a generally elliptical tube-shaped body similar to that of the rotor housings and has an opening 216 extending through. A gasket 218 is positioned at each end of the gear housing 214. The gear housings 214 house timing gears 214a (see FIG. 3A), which are configured to keep the pistons from clashing (i.e., colliding during rotation of the pistons). The timing gears 214a are lubricated in contained in a separate gear housing 214 with gaskets on both sides to prevent oil leakage. Since, in the present invention, there are no products of combustion, the oil never needs to be changed.

The support structure 202 also includes a plurality of bearing housings 222. The bearing housings 222 are positioned at each end of the support structure (the exploded view in FIG. 3 does not illustrate a bearing housing 222 at a front end of the support structure, but this feature is illustrated in FIGS. 1 and 2). Additionally, one or more bearing housings 222 are disposed between other components along the support structure 202. Each of the bearing housing(s) 222 includes two through holes 228. The support structure 202 includes lip seals 230 disposed in each of the through holes. Each of the bearing housings 222 includes two bearings 222a (see FIG. 3A) and two lip seals 230. The bearing housing 222 assemblies support the rotating groups (e.g., pistons and gears) on true centers by means of shafts passing through the bearings 222a. The bearings 222a are hardened steel automotive-type bearings and the lip seals 230 are molded rubber-to-metal with shaft contact.

Each of the rotor housing(s) 204, the heat sink(s) 208, the sideplate(s) 212, the house gear 214 and the bearing housing(s) 222 include a dowel hole 224 at a top and a bottom thereof, respectively. The dowel holes 224 are configured to receive dowel pins 226 to fixedly connect each component of the support structure 202.

Moreover, the components of the support structure 202 are further connected by one or more stud tie rods 232. Each bearing housing(s) 222 includes connecting holes 234 at each corner of the bearing housing 222 configured to receive one of the stud tie rods 232. That is, as is illustrated in FIG. 2, the support structure 202 includes four stud tie rods 232 extending from a front of the support structure 202 to a rear of the support structure 202, each o the rods 232 passing through a connecting hole 234 on each of the bearing housings 222. The rods 232 are fixed to the support structure at each end of the rod by a washer 238 and nut 236.

Finally, the support structure 202 includes a mount 238 at each end of the support structure 202. The mounts 238 are secured to the front most and rear most bearing housings 222 by fasteners 239 (e.g., bolts). The mounts 238 include mounting holes 237 and are configured to mount the support structure to a vehicle engine block.

As noted above, in certain exemplary embodiments of the invention, the compressor module 400 has three pairs of non-meshing externally timed rotary pistons in a common cylinder with a total displacement of 195 Cu. In./Rev. It is belt driven from the expander with a 4:3 ratio to produce 400 CFM at 30 PSIG at 3,000 RPM engine speed. The parasitic HP of the compressor at these values is 400×30/200=60 HP. This provides an ideal 14.7:1 stoichiometric air/fuel mixture. Since the pistons/rotors and all rotating components are on true centers, there is no need for counterweights and speed is only limited by the fuel and air available in the expander cylinder. Each of the rotor housing(s) 204, the heat sink(s) 208, the sideplate(s) 212, the house gear 214 and the bearing housing(s) 222 and the rotors are made of, for example, cast aluminum. Furthermore, all of the metal components are electro-less nickel plated after processing.

As noted above, in certain exemplary embodiments of the invention, the expander module 200 has three pairs of non-meshing externally timed rotary pistons in a common cylinder with a total displacement of 195 Cu. In./Rev. The piston profile does not have any fixed radial dimensions subject to temperature growth so precise timing between the gears and pistons/rotors is not necessary. There are no "dead spots" (the feature regarding "dead spots" is detailed further below) in the piston rotation as one quadrant is always active, so the expander module 400 does not have to be timed with the rotary valve 300. At 140 BMEP (brake mean effective pressure) and 500° F., the engine 100 delivers 360 lb. ft. torque and 200 BHP at 3.000 RPM. Complete combustion at low pressure and temperature minimize nitrous oxide, carbon monoxide and other toxic exhaust emissions. Fuel injectors and spark plugs are mounted to the side housings of the cylinder. At 200 BHP with 25% thermal efficiency the injectors deliver 100 Lbs./Hr. (16.6 GPH).

Each of the rotor housing(s) 204, the heat sink(s) 208, the sideplate(s) 212, the house gear 214 and the bearing housing(s) 222 and the rotors are made of, for example, cast aluminum. All metal components of the expander module 200 (and the compressor module 400) are electro-less nickel plated after processing.

Figure 4:
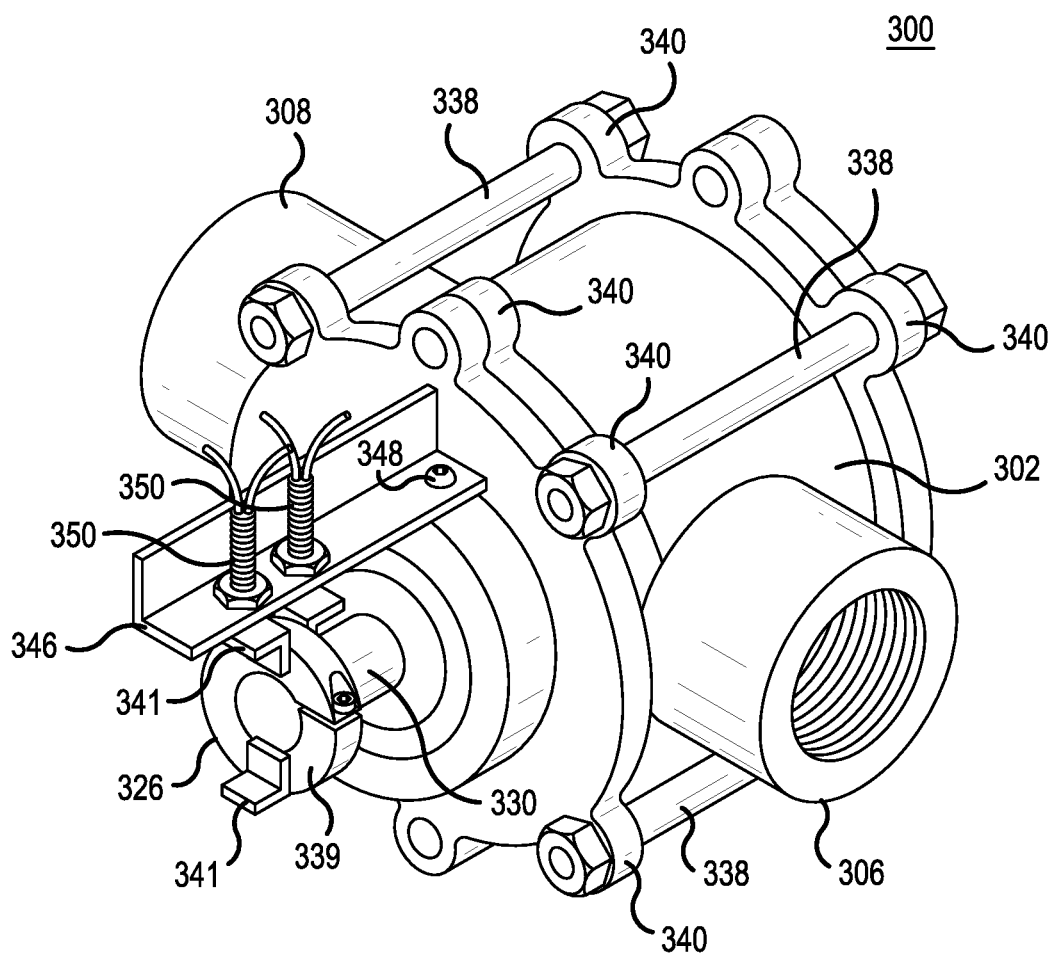
FIG. 4 illustrates a rotary valve 300 in accordance with certain exemplary, non-limiting embodiments of the present invention.
Figure 5:
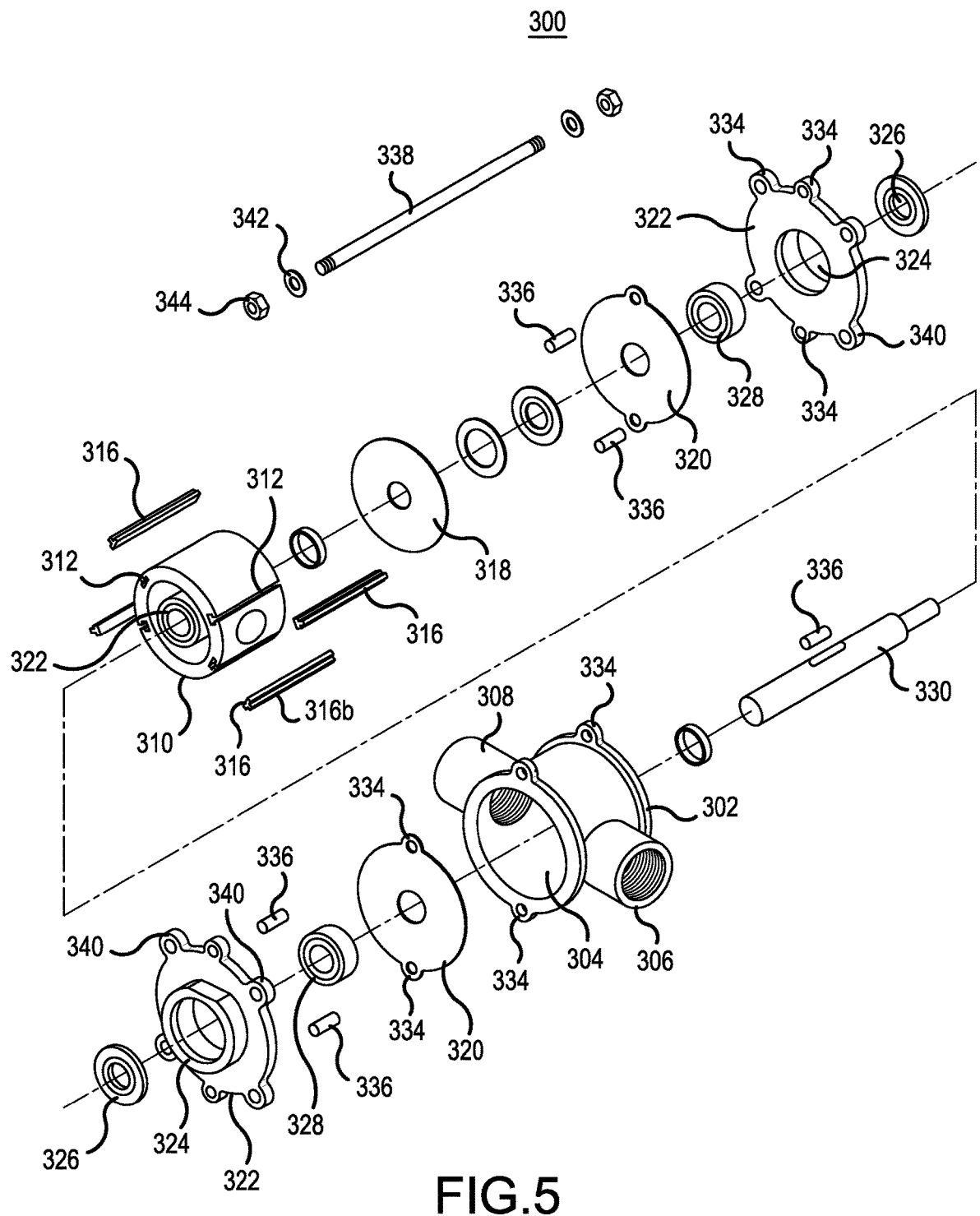
FIG. 5 illustrates an exploded view of the rotary valve 300 illustrated in FIG. 4.
Figure 6:
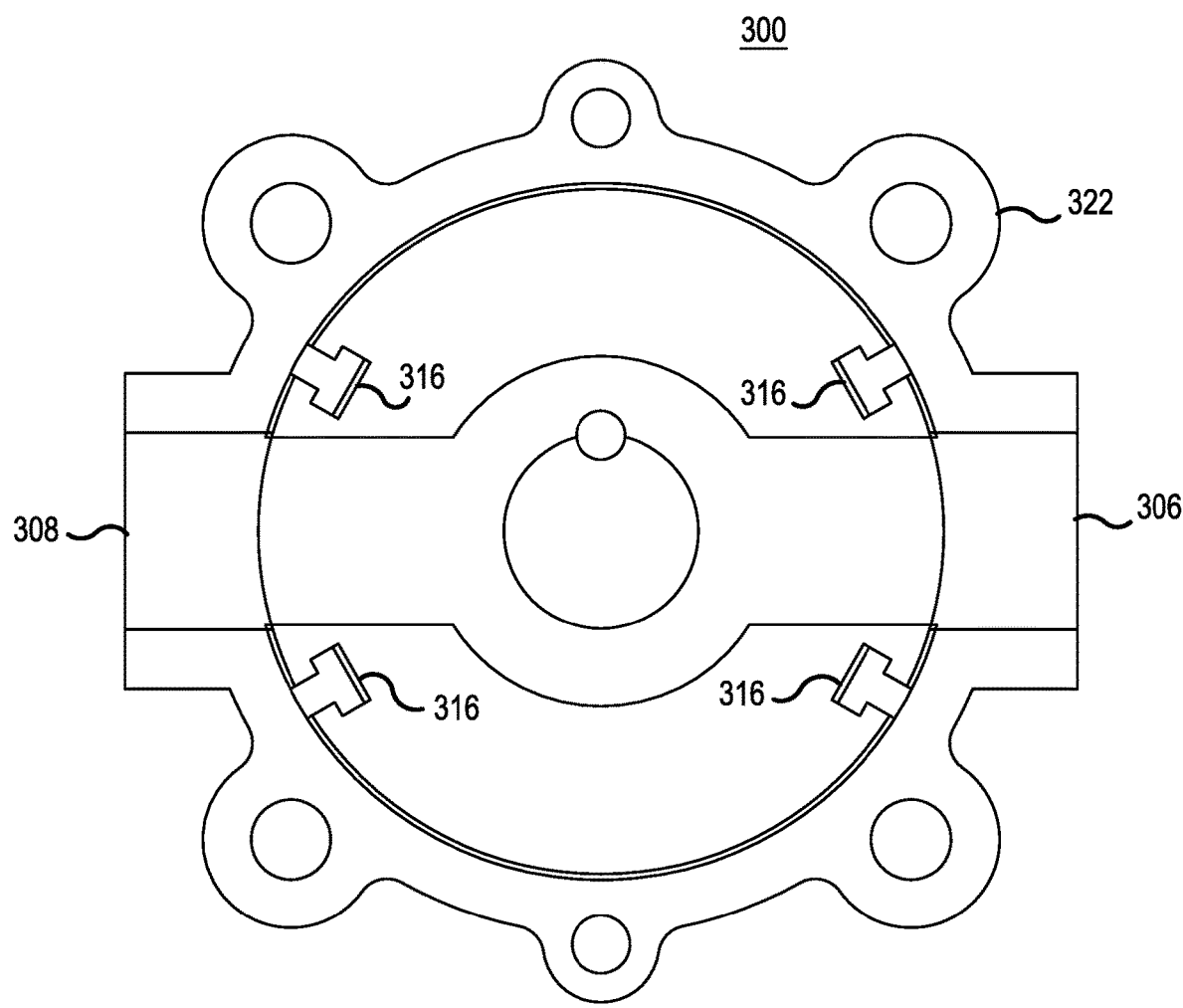
FIG. 6 is a cross sectional view of the rotary valve 300.

The compressor module 400 and the expander module 200 are connected by the rotary valve 300. That is, the rotary valve 300 meters moist air from the compressor module 400 to an inlet of the expander module 200. Turning to FIGS. 4 and 5, the rotary valve 300 includes a rotary housing 302. The rotary housing 302 has a generally circular, tube shape having an opening 304 extending through the rotary housing 302. A first internally threaded side opening 306 is formed on a first side of the rotary housing 302 and is configured to engage an inlet of the expander module 200. A second internally threaded side opening 308 is formed on a second side of the rotary housing 302, opposite to the first side, and is configured to engage an outlet of the compressor module 400.

A rotor 310 is received within the rotary housing 302. The rotor 310 is configured to provide positive displacement devices for compressing incoming air and expanding the ignited fuel/air mixture in the combustor creating power to drive the compressor. The rotor 310 includes one or more grooves 312 formed along an exterior of the rotor 310. For example, in the exemplary embodiment illustrated in FIG. 5 and FIG. 6, the rotor 310 includes four grooves 312 each extending from a front of the rotor 310 to a rear of the rotor 310. Each of the grooves 312 is configured to receive a tip seal 316. Each tip seal 316 has a main body 316a received within the grooves and an elongate projection 316b, a portion of which projects outward from the exterior of the rotor 310. The tip seals 316 are made of brass, cast iron or ceramic (e.g., boron aluminum magnesium alloy). The tip seals 316 provide a seal between the major diameter of the pistons and the piston housing. Unlike the Wankel engine, which has spring loaded seals that continuously wear, the tip seals 316 are captured in a "T" slot and centrifugal force holds them out radially. On initial start-up of a new engine, the tip seals 316 are sacrificial and wear until they have line contact with the rotor housing 204/206, then never wear any further. This is one of the features that require no lubrication in the present engine. The tip seals 316 are made of brass.

The rotor 310 includes a floating end plate 318. The floating end plate 318 is made of stainless steel. The floating endplates determine the biasing pressures across the plate. Temperature causes iron and steel to grow at 0.000006 In./In./° F. in all planes. At 600° F., the pistons for the present engine will grow 0.048 inch axially. This cannot be controlled with clearances. The floating endplates 318 accommodate this growth while keeping them in contact with the pistons using a 1-2 PSIG biasing pressure.

The rotary valve 300 includes a pair of fixed end plates 320 disposed at each end of the rotary housing 302. The end plates 320 form walls at the ends of the rotary housing 302.

The rotary valve also includes a pair of carrier plates 322 disposed at each end of the rotary housing 302. Each carrier plate 322 includes a centrally located through hole 324 configured to receive a lip seal 326 therein. A shaft 330 extends through the rotary valve 300 by passing through a centrally located through hole 332 in the rotor 310. Additionally, the shaft 330 extends through each through hole 324 in the carrier plates 322 to extend outward from the rotary housing 302. A ball bearing 326 is attached to each end of the shaft 330 extending from the rotary housing 302. The ball bearing 326 and the shaft 330 support the timing gears and pistons so they will run on true centers. In addition, keyways in the shafts help provide timing between the gears and pistons.

Each of the rotary housing 302, the end plates 320 and the carrier plates 322 include a dowel hole 334 at a top and a bottom thereof, respectively. The dowel holes 334 are configured to receive dowel pins 336 to fixedly connect the components of the rotary valve 300.

Moreover, the components of the rotary valve 300 are further connected by one or more stud tie rods 338. Each carrier plate 322 includes connecting holes 340 at each corner of the carrier plates 322 configured to receive one of the stud tie rods 338. That is, as is illustrated in FIG. 4, the rotary valve 300 includes four stud tie rods 338 extending from a front of the rotary valve 300 to a rear of the rotary valve 300, each of the rods 338 passing through a connecting hole 340 on each of the carrier plates 322. The rods 338 are fixed to the carrier plates 322 at each end of the rod by a washer 342 and nut 344.

A support plate 346 is mounted on the front carrier plate 322 by one or more fasteners 348. A pair of proximity switches 350 is mounted on the support plate 346. In accordance with certain exemplary embodiments of the invention, the proximity switches are 12 VDC with one N.O. and one N.C. The inductive proximity switches are mounted on the rotary valve and serve as the only timing needed on the present engine. The switches are activated by non-contacting metal targets mounted to a shaft collar and passing near them. They nave an option of normally open (N. O.) or normally closed (N.C.). They are timed with the valve rotor and function to trigger the fuel injectors and spark plugs 1226. The fuel injectors are ground based and are triggered when no power is applied so they need a N.C. switch. The spark plugs are power based, so they need a N.O. switch.

Figure 12:
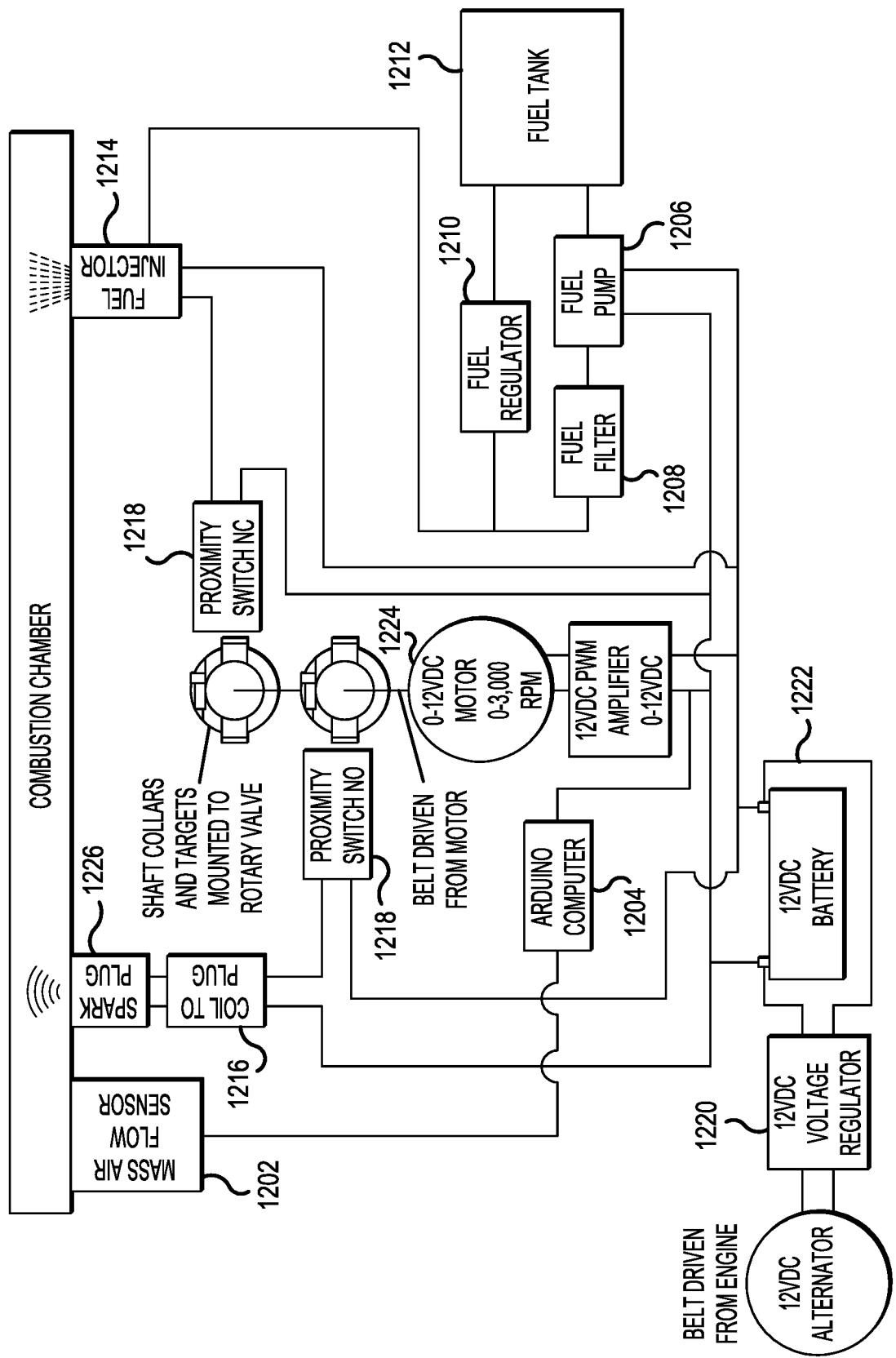
FIG. 12 illustrates a schematic diagram of certain features of the present invention.
Figure 13:
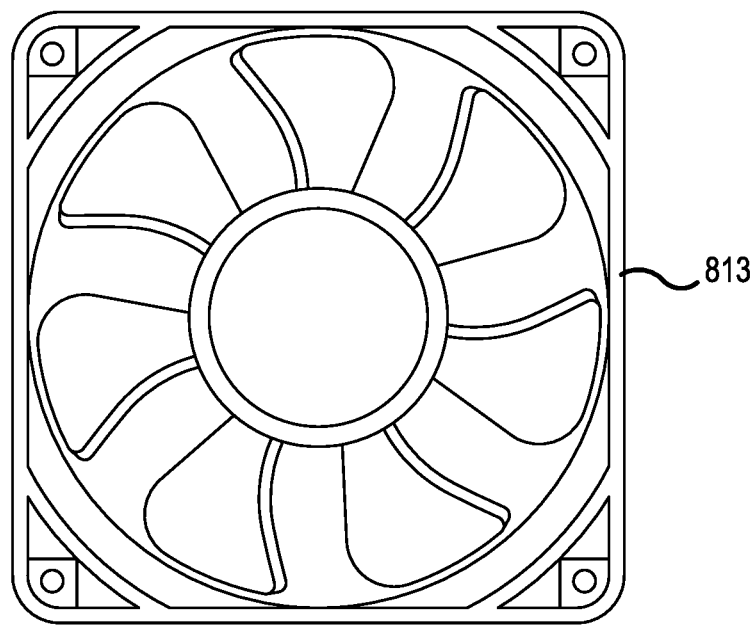
FIG. 13 illustrates a fan 813 according to certain exemplary aspects of the invention.

The rotary valve 300 connects the compressor module 400 to the expander module 200 and meters moist air from the compressor module 400 to an inlet on the expander module 200 The rotary valve 300 is belt driven from a motor (e.g., a 12 VSC 100 W 0-3,000 RPM motor). A potentiometer on the pulse width modulation motor controller controls the RPM of the engine 100 and starts the engine 100. Each revolution of the rotor 310 produces two charges of air through a 1.0" diameter port in filter piping 1002, detailed below, with a flow capacity of 400 CFM. The ports open for 60°, so at 3,000 valve RPM the engine will run at 6,000 RPM. All timing sequences of the engine 100 are contained on the rotary valve. Specifically, the only timing required is between the rotary valve rotor and the proximity switches attached to it that trigger the fuel injectors and the spark plugs. The position of the rotary pistons is unimportant because one quadrant is always active. An external shaft collar 329 carries four targets 341 that trigger the two inductive proximity switches 350 immediately after port closure. The switches 350 (one switch is normally open and one switch is normally closed) activate the expander fuel injectors and spark plugs (see FIG. 12). An automotive mass air flow sensor 1202 and a programmable microprocessor 1204 (e.g., an Arduino computer; FIG. 12) will fine tune the activation time for optimum performance.

No timing is required between the rotary valve 300 and the compressor module 400 or the expander module 200. Again, the only timing required is between the rotary valve rotor and the proximity switches attached to it that trigger the fuel injectors and the spark plugs. The rotor housing 302 is made of cast iron, the bearing carrier housings 322 are made of aluminum, and the rotor 310 is made of carbon steel. The shaft 330 is made of carbon steel. All metal components in the rotary valve 300 are electro-less nickel plated after processing.

FIGS. 7-10 illustrate the rotors, and corresponding rotor assembly, in accordance with certain exemplary embodiments of the present invention.

The rotor 600 includes a cylindrical, center main body 602 having a first end, a second end opposite the first end, an elongate portion 608 extending between the first end and the second end and having a first peripheral surface portion 610 and a second peripheral surface portion 612. A bore 613 extends through a center of the main body 602 from the first end to the second end. A pair of opposed, curved, outer peripheral edge portions 614 is alternatingly disposed between the first peripheral surface portion 612 and the second peripheral surface portion 610. The pair of opposed, curved, outer peripheral edge portions 614 form an outer peripheral surface 618. As is illustrated in FIG. 7, the outer peripheral surface is knurled on the outside diameter to form a radial labyrinth seal, which helps the tip seals on the piston major diameters.

Figure 7:
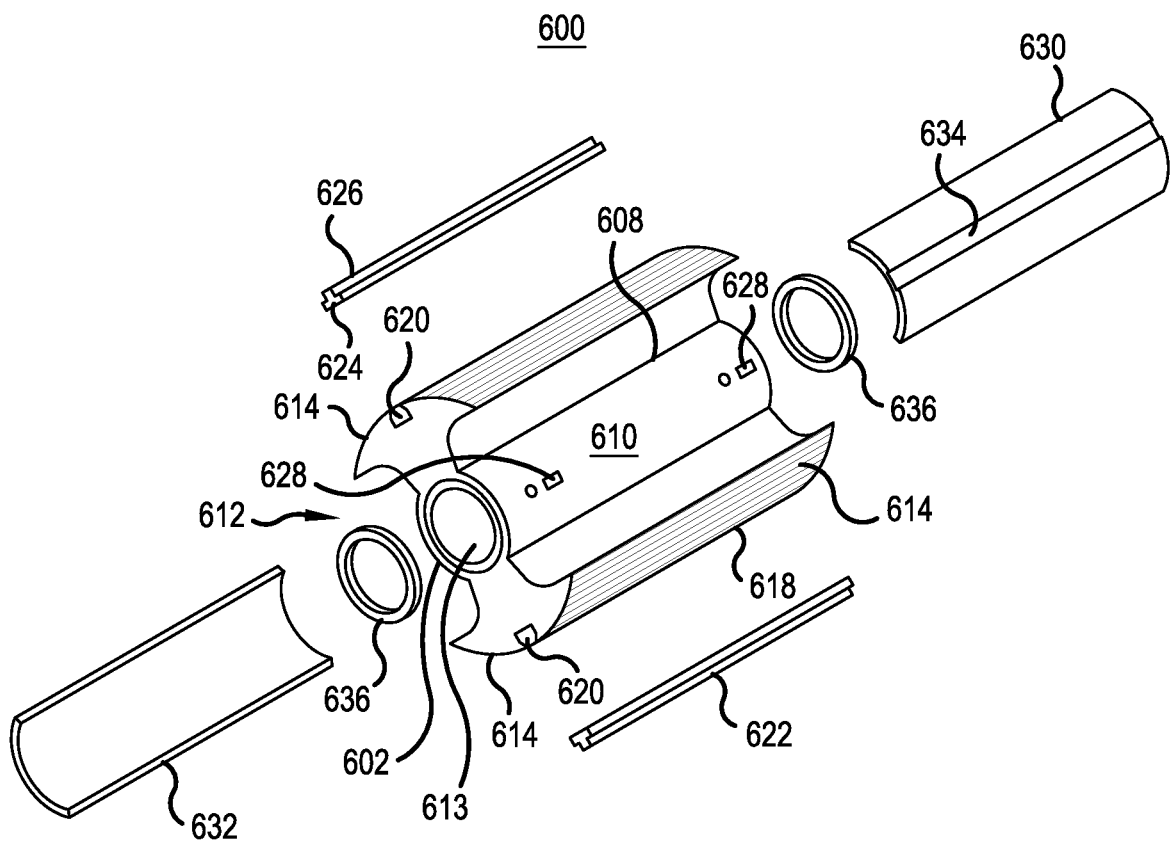
FIG. 7 illustrates a rotor 600 in accordance with certain exemplary, non-limiting embodiments of the present invention.

As is illustrated in FIG. 7, each of the pair of opposed, curved, outer peripheral edge portions 614 has a groove 620 extending along the opposed, curved, outer peripheral edge portions. A tip seal 622 is disposed in each one of the grooves 620. Each tip seal 622 includes an elongate main body 624 and a projection 626 running along an entirety of the main body 624. The tip seal 622 illustrated in FIG. 7 has a same configuration as the tip seal 316 of the rotary valve 300 (see FIG. 5). The main body 624 of the tip seals 622 is received within the grooves 620 and at least a portion of the elongate projection 626 projects outward from the pair of opposed, curved outer peripheral edge portions 614. In accordance with certain exemplary embodiments of the invention, the tip seals 622 are made of brass, cast iron or ceramic (e.g., boron aluminum magnesium alloy).

At least one spring 628 is disposed within the first peripheral surface 610 and the second peripheral surface 612

Figure 8:
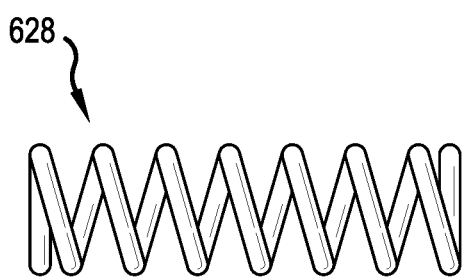
FIG. 8 illustrates an enlarged view of a spring 628 of the rotor 600 illustrated in FIGS. 6 and 7.

(FIG. 8 illustrates a spring 628 in accordance with certain exemplary embodiments of the invention). In accordance with the exemplary embodiment illustrated in FIG. 7, the rotor 600 includes a pair of springs 628 disposed in each of the first peripheral surface 610 and the second peripheral surface 612. The springs 628 aid the centrifugal force in holding the minor diameter seals (i.e., apex seals 630) out during engine start-up.

The rotor 600 also includes a pair of apex seals. A first apex seal 630 is disposed on the first peripheral surface portion 610 and a second apex seal 632 is disposed on the second peripheral surface portion 612. The apex seals comprise elongate, curved plates. Each curve plate makes up one third, axially of a tube or 120° of a circle. The apex seals have an elongate groove 634 extending along an entire length of an outer surface o the apex seal. The elongate groove 634 is configured to receive the projection 626 from a tip seal 622 of another rotor in a pair of rotors during operation. In accordance with certain exemplary embodiments of the invention, the apex seals are made of carbon steel or brass. A washer 636 is disposed at each end of the bore 613. In accordance with certain exemplary embodiments of the invention, the rotors are made of cast steel.

Figure 9:
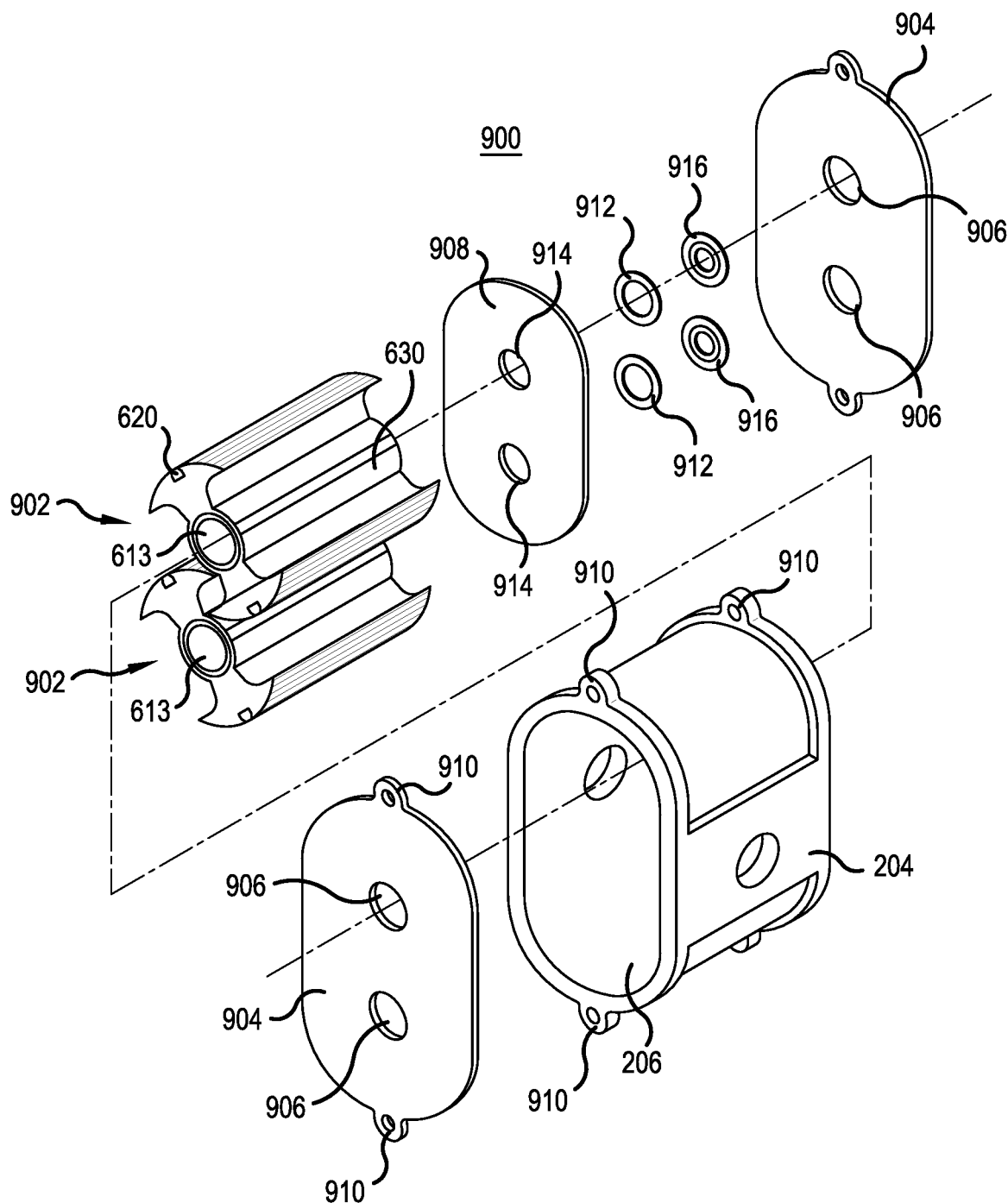
FIG. 9 illustrates an exploded view of a rotor assembly 900 in accordance with certain exemplary, non-limiting embodiments of the present invention.

FIG. 9 illustrates a rotor assembly 900 in accordance with certain exemplary embodiments of the present invention. As noted above, each of the compressor module 400 and the expander module 200 include one or more pairs of non-meshing externally timed rotary pistons (i.e., rotors 600). The rotor assembly 900 includes the rotor housing 204 as detailed above. In accordance with certain exemplary embodiments of the invention, the rotor housing 204 is made of cast iron. As detailed above, the rotor housing 204 has an opening 206 extending through the rotor housing 204 and defining a cavity (or rotor chamber) therein. The pair of non-meshing externally timed rotors 902 (including two of the rotors 600 illustrated in FIGS. 6 and 7) is received within the cavity of the rotor housing 204. End plates 904 are positioned at each end of the rotor housing 204 and cover the opening 206. Each end plate 904 has a pair of through holes 906 therein. The through holes 906 respectively align with the bores 613 of the rotors. The end plates 904 are fixed on opposing ends of the rotor housing 204. Specifically, each of the end plates 904 and each end of the rotor housing 204 has dowel holes 910 at a top and bottom thereof. Dowel pins (not shown) are disposed with the dowel holes to secure the end plates 904 to the rotor housing 204.

A floating end plate 908 is disposed between the rotors and a rear one of the end plates 904. The floating end plate 908 is free to float inside the rotor housing 204 with a clearance of 0.003-0.005 to compensate for axial rotor growth with temperature. At 600° F. the rotors 600 will grow 0.162". A pair of wave washers 912, corresponding aligned with through holes 914 of the floating end plate 908, loosely hold the floating end plate 908 against the pair of rotors 902 centered by a pair of washers 916. For purposes of the present exemplary embodiment of the invention, "loosely held" indicates that the floating end page 908 is held against the pair of rotors while being able to freely move vertically within the rotor housing 204. This allows the invention to adjust tolerances so the biasing pressures on the sides of floating end plate 908 will be 2-3 PSIG, which will minimize friction and wear without requiring lubrication.

Figure 10:
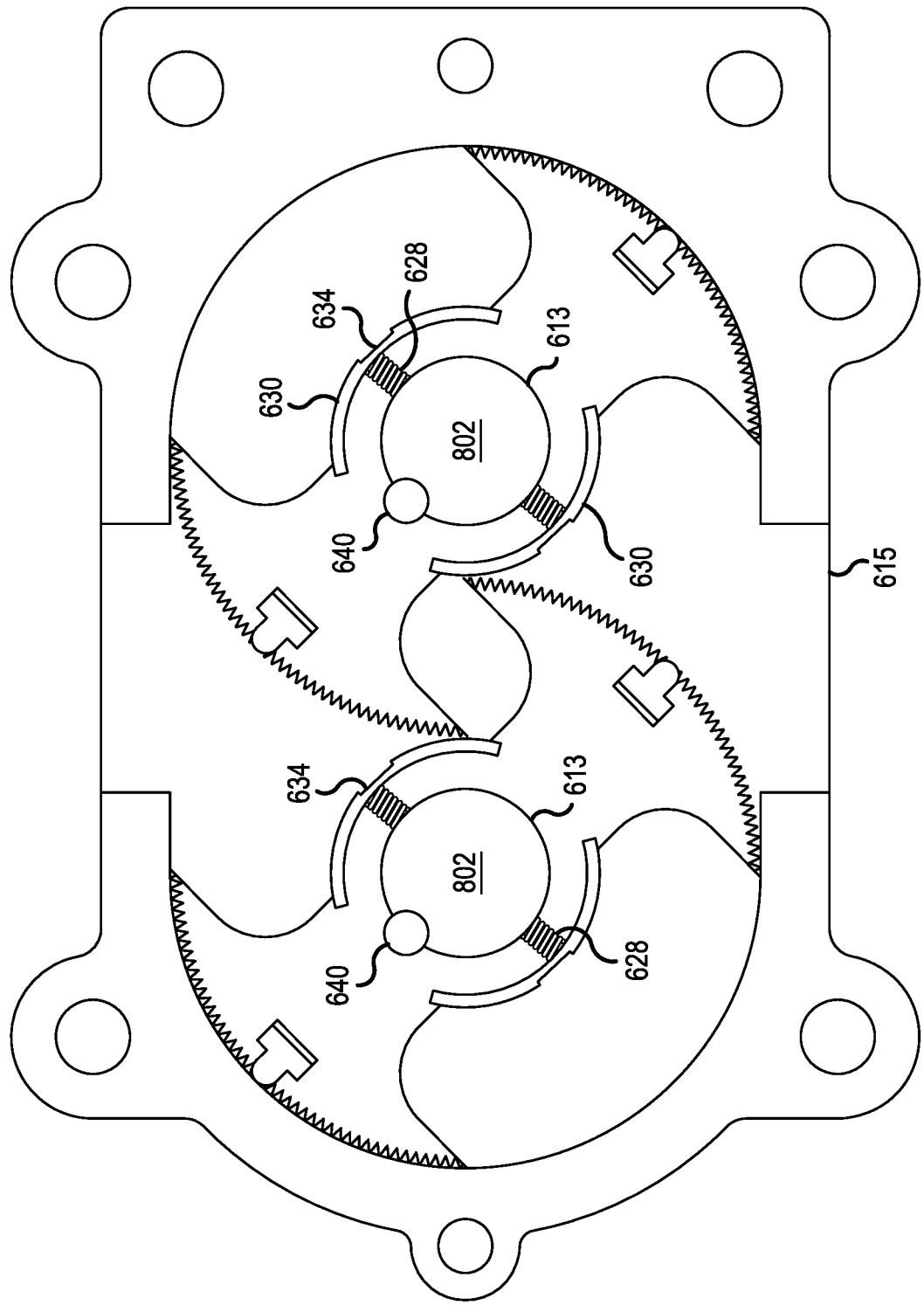
FIG. 10 illustrates a cross-sectional view of the rotor assembly 900 illustrated in FIG. 9.

FIG. 10 illustrates a cross-sectional view of the rotor assembly 900. FIG. 10 illustrates the pair of rotors 902 assembled within the rotor housing 204. As is illustrated in FIG. 10, each rotor 600 includes a key 640. The key 620 locates the gears and pistons radially so they are in time and transmit the engine power to an outside load. In accordance with certain exemplary embodiments of the invention, the key 640 is a hardened steel dowel.

As noted above, there are no "dead spots" (the feature regarding "dead spots" is detailed further below) in the piston rotation as one quadrant is always active. The feature of no "dead spots" eliminates the need for a starter in the present engine. Specifically, referring to FIG. 10, if the pressure is coming through the bottom port 615, with the piston position shown, the lower face of the right-hand piston is active. The left-hand piston is "dead" because the exposed major diameter face has equal pressure across it. If the left-hand piston is turning clockwise, 1° later the tip of the rotor leaves the minor diameter of the left hand piston. At this point the pressure is equal across the two exposed faces of the left-hand piston. However, the tip of the left-hand piston that is just left of the minor diameter now becomes the active quadrant. This is important, because when the fuel injectors and spark plugs fire there will be enough residual air in the expander module 200 to start the engine. Also, no "dead spots" means the position of the pistons is irrelevant to the rotational position of the rotary valve 300.

Figure 11:
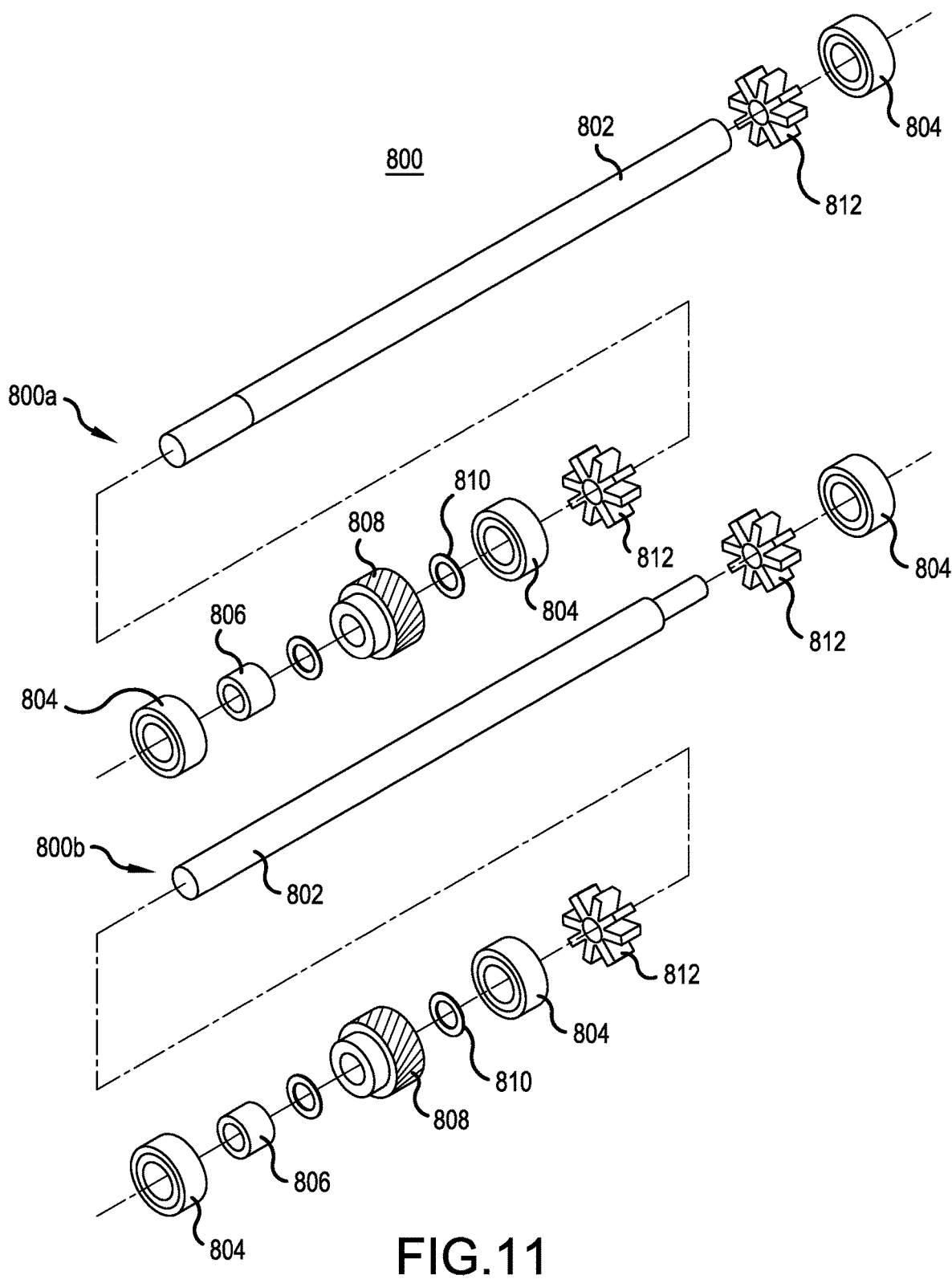
FIG. 11 illustrates an exploded view of a shaft assembly 800 in accordance with certain exemplary, non-limiting embodiments of the present invention.

Furthermore, FIG. 10 illustrates a shaft 802 disposed within the bore 613 of each rotor 600. FIG. 11 illustrates an exploded view of a shaft assembly 800 including the shaft 802 illustrated in FIG. 10.

Each of the compressor module 400 and the expander module 200 includes two shaft assemblies extending therethrough. That is, each of the compressor module 400 and the expander module 200 includes a drive shaft 800a and a driven shaft 800b. Referring again to FIG. 1, the drive shaft 800a extends out from a front end of the compressor module 400 and the expander module 200, while the driven shaft 800b does not extend out from the front end of the compressor module 400 and the expander module 200. Each shaft 800a and 800b is connected to a timing gear and three sets of pistons. The timing gears are meshing but the pistons are non-meshing.

Figure 14:
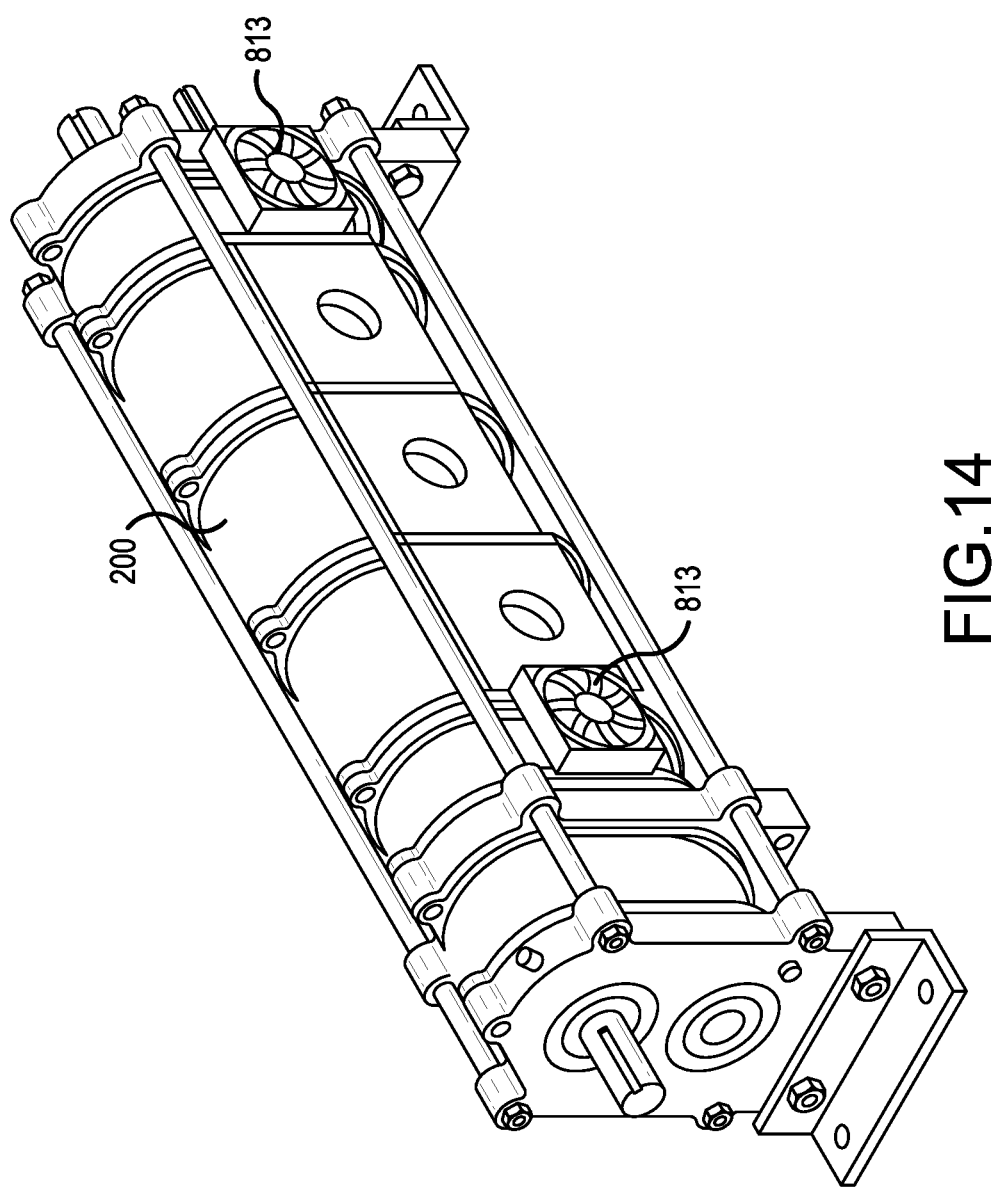
FIG. 14 illustrates two of the fans 813 positioned on the expander module 200.

Each of the drive shaft 800a and the driven shaft 800b includes an elongate shaft 802. In accordance with certain exemplary embodiments of the invention, the shaft 802, and corresponding timing gears, are made of carbon steel. The drive shaft 800a and the driven shaft 800b also each include one or more bearings 804, a pipe spacer 806, a spur gear 808 and a disc spring 810. The spur gears 808 time the pistons radially so they do not clash when rotating. Each of the drive shaft 800a and the driven shaft 800b includes a brass paddle wheel 812 disposed along the elongate shaft. The brass paddle wheel 812 acts as a fan heat sink configured to cool the shaft assembly. The brass paddle wheel 812 has the same structure as the heat sink 208a illustrated in FIG. 3B. Each of the drive shaft 800a and the driven shaft 800b also includes a fan 813 (see FIG. 13), which acts to blow air onto the brass paddle wheel. FIG. 14 illustrates a pair of fans 813 position on the expander module 200.

Referring again to FIG. 1, the inlet filters 1000 are each connected to the expander module by filter piping 1002. The inlet filters 1000 may be any conventional automotive-type filter.

In addition to the components detailed above, the rotary piston internal combustion engine 100 may further include one more accessory mechanical components including, for example, air, a fuel filter 1208, fuel pressure regulator 1210, a fuel tank 1212, 'V' belts and sheaves, and safety guards (see FIG. 12). The filters may be any conventional automotive type. The air filters are rated 400 CFM. The fuel filter and the pressure regulators are rated 10 GPH at 100 PSIG. Belts and sheaves are classic 'V' type, with an "A" cross section for the expander/compressor drive and an "XL" timing belt cross section for the rotary valve and generator drives. The gasoline tank is polyethylene. Electro-mechanical components include a fuel pump 1206, fuel injector(s) 1214, and coil-to-plug converter(s) 1216. Both pumps are 12 VDC and rated 10 GPH at 100 PSIG. The fuel injectors are rated 50 Lbs./Hr. at 40 PSIG and are ground based electrically. The coil-to-plug converters have a 12 VDC input. Accessory electrical components include a generator, inductive proximity switches 1218, voltage regulator 1220, battery 1222 1224, motor controller and an electric motor. All power components are 12 VDC. The generator produces 150 W and 10 A at 3,000 RPM with the voltage regulator is 150 W. The battery is sealed lead acid rated 18 AH. The motor controller is PWM type rated 150 Watts with a potentiometer for 0-12 VDC. The rotary valve drive motor delivers 100 w at 8 A 0-3.000 RPM.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A rotor, comprising:
    a cylindrical, center main body comprising:
        a first end;
        a second end opposite the first end;
        an elongate portion extending between the first end and the second end and having a first peripheral surface portion and a second peripheral surface portion; and
        a bore extending through a center of the main body from the first end to the second end;
    a pair of opposed, curved, outer peripheral edge portions, the pair of opposed, curved outer peripheral edge portions being alternatingly disposed between the first peripheral surface portion and the second peripheral surface portion, the pair of opposed, curved, outer peripheral edge portions forming an outer peripheral surface, each of the pair of opposed, curved, outer peripheral edge portions having a groove extending along the opposed, curved, outer peripheral edge portions;
    a pair of tip seals, each of the pair of tip seals being disposed in one of the grooves; and
    a pair of apex seals disposed on the first peripheral surface portion and the second peripheral surface portion.

2. The rotor according to claim 1, wherein each of the tip seals comprises:
    an elongate main body; and
    an elongate projection extending along the elongate main body.

3. The rotor according to claim 2, wherein the elongate main body of the tip seals is received within the grooves and a portion of the elongate projection projects outward from the pair of opposed, curved outer peripheral edge portions.

4. The rotor according to claim 2, wherein the tip seals are made of brass, cast iron or ceramic.

5. The rotor according to claim 1, wherein the apex seals comprise elongate, curved plates.

6. The rotor according to claim 5, wherein the apex seals further comprise an elongate groove.

7. The rotor according to claim 1, wherein the apex seals are made of carbon steel or brass.

8. The rotor according to claim 1, further comprising a spring disposed within the first peripheral surface portion and the second peripheral surface portion.

9. A rotor assembly, comprising:
    a rotor housing having a rotor chamber disposed therein; and
    a pair of rotors disposed within the rotor chamber, each rotor comprising:
        a cylindrical, center main body comprising:
            a first end;
            a second end opposite the first end;
            an elongate portion extending between the first end and the second end and having a first peripheral surface portion and a second peripheral surface portion; and
            a bore extending through a center of the main body from the first end to the second end;
        a pair of opposed, curved, outer peripheral edge portions, the pair of opposed, curved outer peripheral edge portions being alternatingly disposed between the first peripheral surface portion and the second peripheral surface portion, the pair of opposed, curved, outer peripheral edge portions forming an outer peripheral surface, each of the pair of opposed, curved, outer peripheral edge portions having a groove extending along the opposed, curved, outer peripheral edge portions;
        a pair of tip seals, each of the pair of tip seals being disposed in one of the grooves; and
        a pair of apex seals disposed on the first peripheral surface portion and the second peripheral surface portion; and
    an axially floating end plate disposed within the rotor housing.

10. The rotor assembly according to claim 9, wherein the axially floating end plate is made of stainless steel.

11. An internal combustion engine, comprising:
    an expander comprising:
        a rotor housing having a rotor chamber disposed therein; and
        a pair of rotors disposed within the rotor chamber, each rotor comprising:
            a cylindrical, center main body comprising:
                a first end;
                a second end opposite the first end;
                an elongate portion extending between the first end and the second end and having a first peripheral surface portion and a second peripheral surface portion; and
                a bore extending through a center of the main body from the first end to the second end;
            a pair of opposed, curved, outer peripheral edge portions, the pair of opposed, curved outer peripheral edge portions being alternatingly disposed between the first peripheral surface portion and the second peripheral surface portion, the pair of opposed, curved, outer peripheral edge portions forming an outer peripheral surface, each of the pair of opposed, curved, outer peripheral edge portions having a groove extending along the opposed, curved, outer peripheral edge portions;
            a pair of tip seals, each of the pair of tip seals being disposed in one of the grooves; and
            a pair of apex seals disposed on the first peripheral surface portion and the second peripheral surface portion; and an axially floating end plate disposed at an end of the housing;
a compressor comprising:
  a rotor housing having a rotor chamber disposed therein; and
  a pair of rotors disposed within the rotor chamber, each rotor comprising:
    a cylindrical, center main body comprising:
      a first end;
      a second end opposite the first end;
      an elongate portion extending between the first end and the second end and having a first peripheral surface portion and a second peripheral surface portion; and
      a bore extending through a center of the main body from the first end to the second end;
    a pair of opposed, curved, outer peripheral edge portions, the pair of opposed, curved outer peripheral edge portions being alternatingly disposed between the first peripheral surface portion and the second peripheral surface portion, the pair of opposed, curved, outer peripheral edge portions forming an outer peripheral surface, each of the pair of opposed, curved, outer peripheral edge portions having a groove extending along the opposed, curved, outer peripheral edge portions;
  a pair of tip seals, each of the pair of tip seals being disposed in one of the grooves; and
  a pair of apex seals disposed on the first peripheral surface portion and the second peripheral surface portion; and
  an axially floating end plate disposed within the rotor housing; and
a rotary valve fluidly connecting the expander to the compressor.

12. The internal combustion engine according to claim 11, further comprising a shaft assembly extending between each of the expander and the compressor, the shaft assembly comprising:
  an elongate shaft; and
  a brass paddle wheel disposed along the elongate shaft.

13. The internal combustion engine according to claim 12, wherein the shaft assembly further comprises a fan configured to blow on the paddle wheel.

14. The internal combustion engine according to claim 11, wherein the axially floating end plate of expander and the axially floating end plate of the compressor are made of stainless steel.

15. The internal combustion engine according to claim 11, wherein each of the pair of tip seals of the expander and each of the pair of tip seals of the compressor comprises:
  an elongate main body; and
  an elongate projection extending along the elongate main body.

16. The internal combustion engine according to claim 15, wherein the elongate main body is received within the grooves and a portion of the elongate projection projects outward from the pair of opposed, curved outer peripheral edge portions.

17. The internal combustion engine according to claim 15, wherein the pair of tip seals of the expander and the pair of tip seals of the compressor are made of brass, cast iron or ceramic.

18. The internal combustion engine according to claim 11, wherein the pair of apex seals of the expander and the pair of apex seals of the compressor comprise elongate, curved plates.

19. The internal combustion engine according to claim 18, wherein the pair of apex seals of the expander and the pair of apex seals of the compressor further comprise an elongate groove.

20. The internal combustion engine according to claim 11, further comprising:
  a first spring disposed within the first peripheral surface portion and the second peripheral surface portion of the expander; and
  a second spring disposed within the first peripheral surface portion and the second peripheral surface portion of the compressor.

* * * * *